United States Patent [19]

Goldman et al.

[11] 4,097,392
[45] Jun. 27, 1978

[54] COPRECIPITATION METHODS AND MANUFACTURE OF SOFT FERRITE MATERIALS AND CORES

[75] Inventors: Alex Goldman, Pittsburgh; Alfred M. Laing, Butler, both of Pa.

[73] Assignee: Spang Industries, Inc., Butler, Pa.

[21] Appl. No.: 561,833

[22] Filed: Mar. 25, 1975

[51] Int. Cl.² ........................................... C01G 49/08
[52] U.S. Cl. .............................. 252/62.62; 252/62.56; 252/62.64; 264/63; 264/65; 264/66; 264/DIG. 25; 264/DIG. 58; 423/594
[58] Field of Search ....................... 252/62.62, 62.56; 264/61, 65, 63; 423/594

[56] References Cited

U.S. PATENT DOCUMENTS

| 2,903,429 | 9/1959 | Guillaud ............................... 264/61 |
| 3,252,913 | 5/1966 | Van Gils et al. .................. 252/62.62 |
| 3,704,226 | 11/1972 | Glus ................................... 252/62.62 |
| 3,743,707 | 7/1973 | Iwase et al. ........................... 264/61 |
| 3,822,210 | 7/1974 | Iwase et al. ........................... 264/61 |

FOREIGN PATENT DOCUMENTS

| 70719/75 | 9/1973 | Japan. |
| 914,773 | 1/1963 | United Kingdom .............. 252/62.62 |
| 1,142,214 | 2/1969 | United Kingdom .................. 264/61 |
| 1,142,215 | 2/1969 | United Kingdom .................. 264/61 |

Primary Examiner—Robert F. White
Assistant Examiner—John A. Parrish
Attorney, Agent, or Firm—Shanley, O'Neil and Baker

[57] ABSTRACT

Manufacturing process for ferrimagnetic materials and pressure compacted soft ferrite components utilizing a "wet" process for compositional preparation of materials in which metal carbonates and metal hydroxides are coprecipitated in controllably selected ratios.

An aqueous solution of metal ions is formed by dissolving pure metals in acid. This aqueous metal ion solution is added to a predetermined solution of carbonate ions and hydroxide ions. Concentrations, temperature, and rates of addition are controlled to select the ratio of carbonate groups to hydroxide groups in the coprecipitated particles and the size of such particles.

The controllably selected ratio of carbonate groups to hydroxide groups facilitates separation of the coprecipitation particles and maintains residual hydroxide groups in the material so as to extend solid-state reactivity of the coprecipitated particles for grain growth and densification purposes until the final heat treatment in which the pressure compacted articles are sintered.

The intermediate materials can be processed in conventional dry processing equipment and the ferrimagnetic powders can be compacted in dies used for dry process ferrites because of matched shrinking ratios. High toroidal permeability and low loss factors are combined in components for telecommunications and higher frequency uses; e.g. manganese-zinc ferrites suitable for filter core and like uses have toroidal permeabilities above 2000 and loss factors in the range of $0.8 \times 10^{-6}$ to $1.5 \times 10^{-6}$ at 100 kHz. Other cores include NiZn ferrites and MgMn ferrites.

30 Claims, 2 Drawing Figures

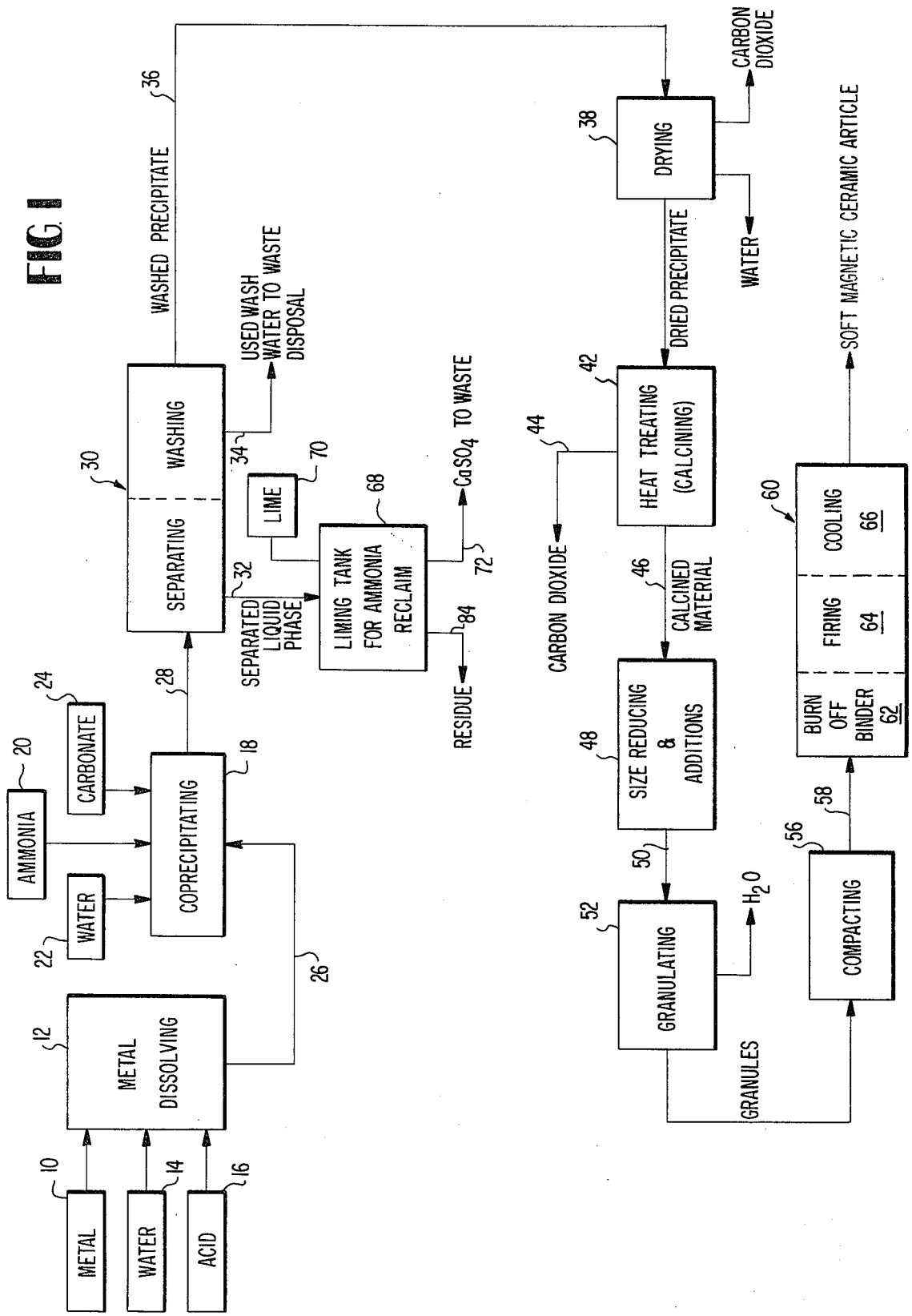

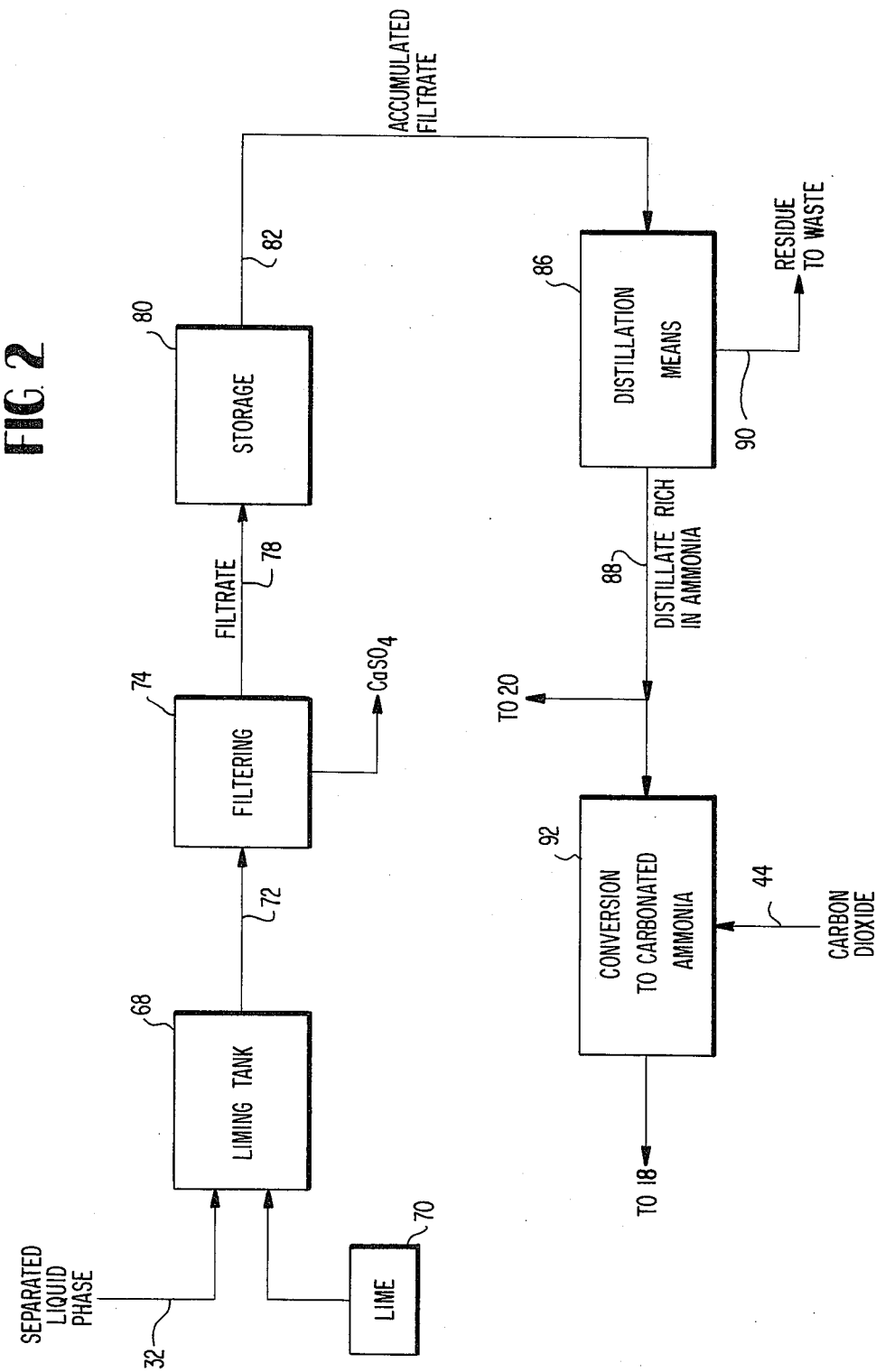

COPRECIPITATION METHODS AND MANUFACTURE OF SOFT FERRITE MATERIALS AND CORES

The invention is concerned with soft ferrites, with preparation of ferrimagnetic material suitable for compaction into soft ferrite components, and with a novel process for producing an intermediate product used in such preparation.

Notwithstanding the exacting nature of ferrite crystal lattice structure, somewhat empirical mechanical approaches are conventionally used to obtain functional materials for manufacture of magnetic ceramics. However, somewhat rigid standards and specifications relating to magnetic properties such as permeability, loss factor and stability, and relating to physical properties such as dimensions, strength, and surface conditions, have been formulated by the industry for soft ferrites, especially those used in telecommunications and higher frequency uses.

The field of contribution of the present invention extends to both the theory of ferrite microstructure formation and to practical and workable processes for consistently meeting industry dimensional specifications while consistently meeting or exceeding presently available magnetic specifications. Additional background information on the nature of ferrites and basic definitions of the ferrite art are available in the text "Soft Ferrites" by E. C. Snelling, published by Iliffe Bookes Ltd., 42 Russell Square, London, WC-7, 1969, see especially Chapter 1 - Ferrites: Their Nature, Preparation and Processing, and Chapter 3 - Properties of Some Manganese Zinc and Nickel Zinc Ferrites.

Process steps conventionally used for the manufacture of soft ferrites, such as manganese-zinc ferrites, have been established for many years; e.g. see the U.S. patent to Guillaud No. 2,886,529 of May 12, 1959. In such conventional processes for the manufacture of polycrystalline ferrites, measured amounts of metal oxides or metal carbonates are mixed together and pulverized. Calcining the pulverized materials at temperatures up to 1000° C. initiates solid state diffusion and formation of the desired spinel-type crystal structure. Further milling followed by granulating to size prepares a powder suitable for pressure compaction into components which are sintered at temperatures from 1200° C. to 1500° C. Because the starting materials are dry, such procedure has been termed a "dry" process for manufacture of ferrite materials, although wet mixing and wet milling steps may be included in subsequent processing.

In commerical manufacture of soft ferrites to date, such dry processes have been used substantially exclusively notwithstanding their laborious nature and other deficiencies. Certain limitations are inherent in such dry processing of materials. Obtaining desired homogeneity, for example, has been limited by mechanical mixing and pulverizing; in fact it is difficult to avoid "unmixing" in which one or more of the starting constituents becomes more concentrated in certain parts of the mass. Also, precise product composition has, for practical purposes, not been possible with such dry processes; repetition of precision compositional relationships has been similarly impossible. There are a number of reasons for this. Impurity content is not readily controllable with known dry processes. Also, the metal content of the various metal oxides and metal carbonates is not precisely known at the outset and such metal content can change in an unpredictable manner during storage.

The invention deals with relieving shortcomings in the basic materials for ferrite manufacture and with combining such contributions affecting the basic ferrite structure into the practical art of soft ferrite component manufacture where standardized equipment and product specifications now exist.

The invention provides a novel "wet" process to replace the mechanical pulverizing, grinding, and intermixing approach to composition of the dry process. In this "wet" process for producing materials for processing into ferrites, constituents are precipitated, more particularly coprecipitated, from solution.

Better homogeneity in intermediate and end products than is available with the mechanical approach of the conventional dry process is part of wet processing. But precipitation from a solution made from metal salts in itself is not sufficient to overcome dry process deficiencies; e.g. the composition of the metal salt is not accurately known due to different degrees of hydration. Notwithstanding existence of precipitation theory for many years, e.g. in the manufacture of recording tape materials, there has been no widespread commercial application, or acceptance, prior to the present invention of a "wet" process (i.e. coprecipitation process) to the production of ferrimagnetic materials for soft ferrite components, for example filter cores and uses typically filled by dry process manganese-zinc ferrites or for other soft ferrites, e.g. for higher frequency uses typically filled by nickel-zinc ferrites. The reasons for this involve both economics and difficulties in compatability with dry processes and equipment for handling dry process materials.

Other difficulties may have helped block use of a wet process in soft ferrite component manufacture. It has been found, for example, that coprecipitating metal constituents as carbonates does not lead to commercialy practical materials for component manufacture. Although carbonate precipitates are easily recoverable from solution, when an attempt is made to produce a compacted article from such material calcined at a low temperature, gross crackling or warping occurs in the compacted article during sintering. If such material is calcined at a higher temperature, non-reactive ("dead") material results; cores compacted from the latter material have poor magnetic properties due largely, it is believed, to discontinuous grain growth during sintering.

It has also been found that, forming a solution of iron ions (ferric or ferrous) in combination with divalent ions of other metals and precipitating entirely as hydroxides causes processing difficulties. Such a reaction produces gelatinous material from which precipitate is not easily separated or washed. In addition to difficulty in separating, the gelatinous material is likely to absorb and retain impurities with resulting contamination which extends to finished product and causes poor magnetic properties.

If the separability problem is overcome, one significant problem remaining is that compaction cannot be carried out in the same dies used in processing conventional dry process material because of differing percentages of shrinkage encountered during sintering. The resulting differing sized parts are unacceptable commercially because of internationally standardized sizes and specifications in the magnetic components industry. Because of the cost of precision dies, and for other reasons, separate sets of dies are not economically practical. Moreover, finishing of such parts requires special precautions because of over sensitivity to to high magnetic fields, thermal shock, machining stress, and the like.

The present invention provides a wet process for preparing an intermediate product convertible to ferrimagnetic material for use, and especially suitable for, manufacture of soft ferrite components by pressure compaction.

The wet process of the present invention provides for producing higher purity materials than are obtainable utilizing dry processing. The quality control problems normally associated with dry processing are eliminated and precise compositional results are reproducible from run to run.

In the manufacture of high quality manganese-zinc ferrites, the present invention provides for utilizing the same equipment used for handling and compacting conventional dry process material and ferrite components. Therefore, either wet process or dry process material can be fed into the same production line leading to compacted products and, the compacted articles can be finished and used without special precautions.

Other novel features and significant contributions of the invention will be considered in the general process description below and in the detailed examples provided.

In carrying out the wet process of the invention, an aqueous solution of ferrous ions and other divalent metal ions is formed. This metal ion solution is reacted to coprecipitate ferrous and other divalent metal carbonates while concurrently coprecipitating ferrous and other divalent metal hydroxides. This simultaneous coprecipitation of metal hydroxides and metal carbonates is accomplished essentially without conversion of ferrous ions to ferric ions.

An important contribution of the invention involves selecting and controlling the ratio of carbonate groups to hydroxide groups in the precipitate. The ratio of carbonate groups to hydroxide groups precipitated is controllably selected to provide coprecipitated particles which are recoverable (can be separated from liquid phase) and, to provide sufficient hydroxide groups to maintain residual hydroxide groups so as to extend solid state reactivity of the coprecipitated particles, for purposes of normal grain growth and densification, until a final heat treatment of the compacted article. This persistence of residual hydroxide groups beyond calcining provided by the invention is deemed to be the result of hydrogen bonding forces.

The wet reaction of the invention is carried out by concurrently reacting metal ions (ferrous ions and other divalent metal ions) with carbonate ions and with hydroxide ions. Such concurrent coprecipitation is carried out to avoid significant loss of metal ions and precipitate in separating the precipitate from the liquid phase and in washing the precipitate. Divalent metals used in this wet process manufacture of an intermediate product for conversion to ferrimagnetic material compactable into soft ferrites include $Fe^{++}$, $Mn^{++}$, $Zn^{++}$, $Ni^{++}$, and $Mg^{++}$.

The ratio of carbonate groups to hydroxide groups is selected based on separability of the precipitate from the liquid phase and the maintenance of sufficient residual hydroxide groups for final sintering reactivity. For example, in the manufacture of manganese-zinc ferrite components suitable for telecommunication and like uses, the ratio of carbonate groups to hydroxide groups in the coprecipitated particles is desirable selected to range from about 3:2 to about 20:1. If the ratio of carbonate groups to hydroxide groups is less than about 3:2, there is a precipitate separability problem and, further, a zinc loss problem due to complexing with the hydroxide. If the ratio exceeds about 20:1, a material is produced which cannot be readily processed into satisfactory cores because of unusual and undesirable shrinkage or grain growth characteristics during sintering. The ratio of carbonate groups to hydroxide groups for the manufacture of suitable manganese-zinc ferrimagnetic material, preferably ranges from about 4:1 to 20:1. Measurements, for these ratios, are made of precipitate after separating and washing.

The desired ratio of carbonate groups to hydroxide groups in the precipitate is controllably affected by one or more of the following factors: concentrations, i.e. relative excesses of the precipitants, the pH of reaction mixtures, the temperature of reaction mixtures, the rate of intermixing of reactants, and the order of combining the reactants.

An important teaching of the invention relating to high-purity, quality-controlled reproducibility from run to run, and resulting desirable magnetic properties, involves the source of the metal ions. For these purposes, pure metals are used as starting materials in making the aqueous metal ion solution rather than salts of the metals. Forming an aqueous solution of substantially pure metals eliminates the variation of the metal composition of salts which frequently varies from batch to batch, and with aging, due to uncertainties of water of hydration. Purity of the water used in solution is also important. Further, as the precipitate is separated from a liquid phase, it is washed to remove solubles not participating in the reaction. This washing agent is also, preferably deionized water of about 10 million ohm resistance The washed precipitate is then dried to remove essentially all free water. Drying, dependent on temperature, can also have the effect of driving off some carbon dioxide, some bound water, and of converting some ferrous ions to ferric ions. However, in general, these effects are carried out in subsequent processing. The dried precipitate is sufficiently stable to enable shipping for processing by others.

In the continued processing of dried precipitate for the production of MnZn, NiZn, and MgMn ferrimagnetic product, significantly lower temperatures (calcining and firing) are possible than those required with dry process materials. The dried precipitate is heat treated (calcined) at a temperature exceeding about 500° C. but less than about 800° C. to drive off remaining carbon dioxide and bound water. This step has the effect of converting a substantial portion of the remainder of the ferrous ions to ferric ions and formation of spinel crystal structure. A ferrimagnetic material is formed while reserving, partially because of the relatively low temperature, part of the solid-state reactivity until a final heat treatment, i.e. sintering of the component. This reserved solid-state reactivity may include completion of the ferrite formation.

Such low temperature calcining is a distinct advantage of the invention. In practice of the prior art, calcining of soft ferrite materials is carried out at significantly higher temperatures, generally in the region of 1000° C.

After the relatively low temperature calcining of the present invention the calcined material is prepared for compaction. Part of the contribution of the invention is that the steps following calcining for preparing the material for compaction can be carried out with known dry process equipment and techniques. In brief the steps include: size reducing, making additives for improving magnetic performance and physical processing, followed by a granulating step in which the mixture is dried as agglomerated granules in a desired size range for compacting. For further background on such powder preparation techniques see U.S. Pat. No. 3,860,525 to Goldman of 1/14/75, which background teachings on powder preparation and physical processing additives are included herein by reference.

After granulating, the resulting pulverant ferrimagnetic material is homogeneous and compactable to suitable selected green densities at pressures between about five and forty tons per square inch. Such compaction can be carried out with equipment and in dies utilized for compacting conventional dry process manganese-zinc ferrite material because of matched shrinkage characteristics provided by the invention.

After compacting, the articles are treated to burn off binder so as to remove what would be otherwise a contaminant and interfere with further processing. Burning off of binder can take place in conjunction with the final heat treatment, in that the burn-off zone can be an introductory part of the overall furnace structure including a firing zone.

A further significant contribution to the purity and unusual properties of the product is the lower temperature range firing made possible by the invention; that is about 1000° C. to 1200° C. for MnZn ferrites, with possible extension to 1250° C. for NiZn and MgMn ferrites. The lower firing temperatures made possible by the invention lead to a fine grain size which is important in high frequency applications and substantially decrease impurity pick-up from refractories which occurs at higher temperature firing. The sintering causes the product to become stoichiometric with respect to oxygen, completes the crystal structure, and, with the proper solid state reactivity maintained by the invention, results in desirable grain growth and densification.

The resulting magnetically-soft ceramic articles contain ferric oxide in combination with at least one divalent metal oxide. Further, components of the present invention can take the post sintering finishing operations, e.g. edge grinding, application of chemical finishes, and washing, with no added precautions over those applied with dry process cores. Such cores can also be used without any additional precautions than those utilized with dry process soft ferrite cores.

In the accompanying drawings:
FIG. 1 is a flow-sheet for schematically illustrating the invention, and
FIG. 2 is a flow-sheet schematically illustrating recycling aspects of the invention.

Steps for carrying out teachings of the invention in the manufacture of soft manganese-zinc ferrite components are shown schematically in FIG. 1. High purity metals are provided from source 10. An aqueous solution of metal ions is formed by initially adding preselected proportions of the high purity metals from source 10 into a dissolving zone 12, comprising a tank or vat capable of withstanding acid solutions. The metals are preferably in easily dissolvable form, such as flakes powder, thin strips, or small pellets and are selected to have a total purity level greater than 99.9% by weight. That is, the total of the impurities in all of the metals should be less than 0.1% of the total weight of the metals for purposes of producing the highest quality ferrite components.

The amount of metals dissolved is determined by the relative proportions of oxides desired in the finished product. The initial proportions are calculated stoichiometrically with allowance for minor iron pickup in a later size-reducing step.

In the production of manganese-zinc ferrite components, the proportions are selected within the following ranges:
about 66 to about 72% iron,
about 16% to about 23% manganese, and
about 5% to about 18% zinc,
these being the weight percentages of metals utilized, based on the total weight of the three metals, to produce a ferrite having the following mole percentages:
about 50% ferric oxide ($Fe_2O_3$),
about 2 to about 9% ferrous oxide (FeO),
about 31 to about 36% manganese oxide (MnO), and
about 10 to about 15% zinc oxide (ZnO).
The ratio of ferric ions to divalent metal ions is 2:1 and the total iron present is usually expressed as ferric oxide so that the mole percentage can be expressed as about 52.5 to about 55% ferric oxide ($Fe_2O_3$).

After the metals have been introduced into dissolving zone 12, de-ionized water from source 14 is introduced. Then sulfuric acid from source 16 is added to dissolve the metals producing an aqueous solution of ferrous ions and divalent ions of manganese and zinc. Concentrated sulfuric acid is used in an amount ranging from about 10% to about 30% over stoichiometric requirements to assure dissolution of all the metals; greater than 30% excess would result in acid wastage. The reaction is $$H_2SO_4 + M \rightarrow MSO_4 + H_2 \uparrow$$

where "M" represents the metals dissolved.

The dissolving of the metals can be facilitated by heating and stirring. Such heating is desirably carried out by introducing steam into the mix in tank 12 after the acid has been added. Alternatively, heating can be carried out utilizing a gas burner or an electric heater.

The aqueous solution of metal ions is formed to have a concentration of metal ions ranging from about 1.4 to about 1.6 moles per liter. A minimum amount of water used prior to addition of the acid and final predetermined concentration is adjusted with water after metal dissolution has been accomplished. Concentrations lower than about 1.4 molar are undesirable because of economy of space. Higher concentrations than about 1.6 molar are undesirable because sulfates tend to crystallize out.

By controlled preparation of a solution containing both carbonate ions and hydroxide ions, provision is made for the coprecipitating reaction between the ferrous, manganese, and zinc ions to take place simultaneously with both carbonate ions and hydroxide ions so that ferrous, manganese and zinc carbonates and ferrous, manganese, and zinc hydroxides are precipitated concurrently. The representative reactions are:

$$M^{++} + CO_3^{--} \rightarrow MCO_3$$

$$M^{++} + 2OH^- \rightarrow M(OH)_2$$

where "M" represents the divalent metal ions, $Fe^{++}$, $Mn^{++}$, and $Zn^{++}$.

These coprecipitation reactions are carried out by intermixing the metal ion solution and the solution of carbonate ions and hydroxide ions. The latter solution in the manufacture of manganese-zinc material is formed from ammonium carbonate and ammonium hydroxide.

In a starting run, utilizing tank 18 of FIG. 1, ammonia from source 20 can be introduced with water from source 22 to form ammonium hydroxide to a calculated predetermined concentration.

$$NH_3 + H_2O \rightarrow NH_4^+ + OH^-$$

Alternatively, this can be accomplished by using aqua-ammonia to achieve the same calculated ammonium hydroxide concentration. In runs subsequent to a starting run, utilizing recycling teachings of the invention, the desired ammonium hydroxide concentration is readily achieved by diluting a partially carbonated ammonia solution recovered from the process.

In a starting run, the amount of carbonate (derived from bicarbonate in accordance with the following reaction:

$$NH_3 + HCO_3^- \rightarrow NH_4^+ + CO_3^{--})$$

needed to stoichiometrically react with the metal ions (1:1) plus a 20% excess is calculated and added directly from source 24 of FIG. 1, to the prepared ammonium hydroxide solution. A pH of about 12 is produced with the ammonia before addition of the carbonate. Addition of the predetermined amount of carbonate to the hydroxide solution lowers the pH to approximately 11, usually in the range of 10.8 to 11.

This order of mixing for start up, that is adding the carbonate (or bicarbonate) compound to the ammonium hydroxide solution, is preferred because the high pH of the ammonia solution decreases the possibility of decomposition of the ammonium bicarbonate when added in this order. Also, the concentration of ammonium hydroxide can be measured more accurately without the presence of the carbonates; such concentration can be determined very simply by a density measurement or titration. However, the order of additions can be reversed and the process remain workable. In either event, the concentration of carbonate ions should be in the range of 0.75 to about 1.75 moles per liter.

Coprecipitation reactions are then carried out by introducing the metal ion solution from tank 12, via conduit means 26, into the solution of carbonate ions and hydroxide ions in tank 18. Such addition of metal ion solution is accompanied by continuous agitation.

The rate of addition of metal ion solution is selected to control precipitate particle size and the ratio of carbonate groups to hydroxide groups in the precipitate. This rate of addition varies directly with the volume of carbonate ion-hydroxide ion solution. In producing precipitate for manganese-zinc ferrites, the rate of addition ranges from about 0.01 gallon per minute to about 0.05 gallon per minute of the metal ion solution per gallon of the carbonate ion-hydroxide ion solution. At a rate of addition of less than about 0.01 gallon per minute per gallon, very large particles, substantially completely carbonate, are formed. At a rate of addition greater than 0.05 gallon per minute per gallon, the percentage of metals loss is adversely affected because precipitates of small size particles consisting of a high percentage of hydroxide groups are formed; the latter precipitate is not easily separated.

During the addition of the metal ion solution, the temperature in the reaction mix is controlled to be no higher than about 25° C. If temperatures significantly above this level are used, accelerated decomposition of ammonium carbonate results and solution loss of precipitant increases. Desired temperature control is provided by control of the temperature of original reacting solutions.

The addition of the aqueous solution of ferrous, manganese, and zinc ions is continued until the pH in the liquid phase is at a selected value, ranging from about 7 to about 8, which is a major contributing factor for obtaining the desired ratio of carbonates to hydroxides in the precipitate. The liquid phase remaining is an aqueous solution containing ammonium ions, sulfate ions, and excess carbonate ions. A final pH less than 7 causes excessive amounts of iron and manganese to remain in the liquid phase and also causes vigorous decomposition of the carbonate. At a pH greater than 8 an excessive amount of zinc is lost in the liquid phase as a result of complexing. In addition to wastage of metal values, such losses would result in changing the relative proportions of the final product from those calculated on the basis of starting materials. Preferably, addition of metal ion solution is carried out until the final pH ranges from about 7.3 to 7.6 with 7.5 being the aimed for pH as the metal ion solution is added.

One of the advantages in the use of solutions as reactants in this wet process is that it can be carried out in either a batch process or a continuous flow process.

Subsequent to the coprecipitation reactions being completed, the resulting slurry is transmitted, for example by pumping through conduit 28, to a filtration zone 30. The separating of the precipitant from liquid phase and the isolation of precipitant can be carried out with a rotary vacuum filter in which precipitate is collected on a filter cloth. Liquid phase passes through the cloth into a portion of the structure from where it is removed by conduit means 32 to an ammonia reclaim system to be described later. Alternately, the precipitate can be isolated from the liquid phase by centrifugal action in a basket containing a filter cloth lining. The precipitate isolated in accordance with the invention contains more than 99.9% by weight of the metals originally contained in the aqueous metal ion solution.

The separated precipitate is conveniently washed while it is still on the filter means. When the rotary vacuum filter is utilized the filter cloth passes by a bank of washing sprays during its rotation and the wash water passes out of the filter and is disposed to waste through means 34. The washing is continued until a sample of the wash water indicates freedom from sulfate ions; an acidified barium chloride test can be used for this determination.

When the washing has been completed, washed precipitate is readily removed from the filter cloth by first loosening with an air blast and then mechanically scraping. If the wash, as indicated by test, does not remove the sulfate ions completely, the precipitant can be resuspended and refiltered.

The washed precipitate is transferred by means 36 to a drying zone 38. Drying can be carried out in batch or continuous process with the washed precipitate being spread in thin layers and exposed in a drying oven to a temperature ranging from about 150° C. to about 200° C. in an air atmosphere.

The dried precipitate is then heat treated. Heat treatment means 42 can be a conventional rotary calciner; drying of washed precipitate and calcining can be carried out in the same apparatus. This wet process material can be calcined at a temperature substantially less than that employed with conventional dry process manganese-zinc material. In the present process, calcining temperatures can be above about 500° C. Preferably, calcining is carried out at a temperature ranging from 600° C. to 800° C. Residence time in a continuous-type rotary calciner ranges from about 0.5 to about 1 hour. If a batch calciner is utilized, a suitable time is about 6 hours.

As indicated in FIG. 1, the carbon dioxide which comes off during calcining can be transmitted through conduit means 44 to a recycle portion of the system (shown in FIG. 2).

Calcined material transferred by means 46 is preferably size reduced in a ball mill 48 using a deflocculent such as ammonium lignosulfate. This size reducing is carried out to obtain an average pulverant material size preferably ranging from about 0.3 to about 0.7 microns; pulverant sizes are in terms of the diameter of a spherical particle having the same displacement as the particle being measured; individual pulverant material particles generally have a size ranging from 0.1 to 1 micron.

When conventional additives are to be used, these are advantageously introduced early in the ball milling cycle. Additives developed for prior dry process manufacture of Mn-Zn ferrites include, for example: calcium carbonate, silicon dioxide, titanium dioxide and tin oxide. When used, most such additions are made in very small percentages and do not significantly change the stoichiometry of the basic mix.

Binders and plasticizers are preferably admixed by introduction into the water in the ball mill toward the end of the milling cycle. A suitable binder is polyvinyl alcohol. A typical plasticizer is polyethylene glycol 400.

When size reduction and admixing are carried out in the ball mill some iron pickup results. However, with the teachings of the invention, iron pickup throughout the process is substantially reduced. The wet process step eliminates the original mixing of dry materials and therefore eliminates iron pickup at that stage. Further, the relatively low temperature calcining provided does not produce material as hard as that developed in other processing. Therefore the ball milling required, and the resulting iron pickup, are reduced; because of this, stoichiometry can be more predictably maintained.

The mix resulting from size reduction, and admixing binder and optional additives, is transferred by means 50 for granulation in apparatus 52. Spray drying methods and apparatus are preferred for granulating because it produces a freeflowing powder for pressing; however other granulating methods can be used. Spray drying produces spherical granules containing many ferrite particles bound together. Such agglomerated granules facilitate pressing. Size of the spray dried granules is selected to be about 45 to 250 microns.

The resulting granules are compacted at means 56 which can be a conventional pressing apparatus. Conventional dies for pressing dry process manganese-zinc ferrite are used in the present invention because of the matched shrinkage characterizations (about 14% shrinkage during firing) provided. The compacting is preferably carried out at pressures ranging from about 15 to about 25 tons per square inch. A suitable green density in the range of about 2 to about 3.5 grams per cubic centimeter is obtained.

The compacted articles are transferred by means 58 toward a final heat treatment stage. Heat treatment apparatus 60 can include an initial zone 62 in which binder is burned off in an air atmosphere. Temperatures of 300° C. to 600° C. are available however, preferably, the binder is burned off between about 400° C. and 500° C.

Following passage through the binder burn-off zone, the articles pass through a firing zone 64 and cooling zone 66.

The compacted articles are fired at significantly lower temperatures than those required by other processes. Among the advantages of lower firing temperatures is the reduction in impurity pickup from furnace refractories and the like. With the present process, firing of manganese-zinc ferrites can be carried out at temperatures as low as 1000° C., i.e. in a lower temperature range than the 1200° C. to 1500° C. temperature range for conventional materials. Firing temperatures ranging from 1150° C. for manganese-zinc ferrites provide desired results with firing time ranging from about 4 to 8 hours. Firing of manganese-zinc ferrites is carried out in a controlled atmosphere wherein the oxygen is about 0.5 to about 5% by volume and the balance nitrogen; other atmospheres can be used which exert the equivalent partial pressure of oxygen with the balance neutral.

In the cooling zone 66, manganese-zinc ferrites are exposed to a cooling cycle which correlates temperature with atmosphere. Preferably this cooling is carried out by progressively reducing temperature while progressively reducing the partial pressure of oxygen. Typically the temperature is progressively reduced from firing temperature to about 900° C. while the percentage of oxygen in the atmosphere is progressively decreased from that of the firing atmosphere to a percentage on the order of about 0.01% by volume. Typically this cooling is carried out during a period ranging from one to two hours.

Such manganese-zinc ferrites are characterized by high toroidal permeabilities and low loss factors (1/MuQ) measured at a frequency of 100 kilo-Hertz. In the formula 1/MuQ, Mu is the initial permeability and Q is the quality factor which is equal to the ratio of the inductive reactance to the loss resistance. Typically manganese-zinc ferrite cores manufactured in accordance with the present invention have permeabilities from 1800 to 2500 and higher with loss factors in the range of $0.8 \times 10^{-6}$ to $1.5 \times 10^{-6}$ measured at 100 kHz. Such manganese-zinc ferrite cores meet the exacting requirements for telecommunication circuitry uses, e.g. as channel filters. In addition sensitivity to temperature shock, and other physical effects considered important in the industry are within acceptable standards for dry process ferrite cores.

The wet process steps of the invention, i.e. concurrent coprecipitation of both carbonates and hydroxides, controllably selecting the ratio of carbonate groups to hydroxide groups, and the use of pure metals for making the metal ion solution are applicable to the preparation of dried precipitate for subsequent processing and conversion to ferri-magnetic material for compacting into soft ferrite components including manganese-zinc ferrites, nickel (nickel-zinc) ferrites, and magnesium (magnesium-manganese) ferrites.

Only the manganese-zinc ferrite uses an excess of iron so that ferrous oxide is present to any significant degree in the finished ferrite. Ferric oxide (Fe$_2$O$_3$) is fifty mole percent of the nickel ferrites and fifty mole percent or lower for magnesium ferrites. Oxide proportions for these ferrites determine the original proportions of the pure metals used to make up the metal ion solutions.

In preparing dried precipitate for manufacture of nickel ferrimagnetic materials using the wet process steps of the present invention, sodium or potassium compounds (e.g. sodium carbonate and sodium hydroxide) should be substituted for the ammonium compounds disclosed above in order to avoid the problem of nickel complexes with the ammonia. With such substitution, possible sodium residues must be considered in the final ferrite.

In preparing nickel-zinc ferrite components using the wet process of the present invention, a metal ion solution was prepared with the objective of producing a molar percentage in the components of:
about 50% Fe$_2$O$_3$,
about 25% NiO, and
about 25% ZnO.
The chemistry achieved in the final components verifies for those skilled in the art the exceptional compositional results available with the present invention. The following chemistry was achieved:
49.5 mole % Fe$_2$O$_3$,
25.2 mole % NiO, and
25.3 mole % ZnO.

Among the various NiZn ferrite compositions, known from conventional dry process art, the molar percentage of the NiO can vary between about 17% to 50% as the molar percentage of the ZnO varies between zero and 33% with the ferric ions to divalent metal ions being in the ratio of 2:1.

In the specific nickel-zinc ferrite example, sodium compounds were used in place of ammonium compounds in preparing the carbonate-hydroxide ion solution. The pH of the latter solution with a value of 11 was reduced to 7.5 by addition of the metal ion solution. Other process steps were carried out as described in relation to the manganese-zinc ferrites, with, however, the firing being carried at 1200° C. in air with furnace cooling in the same atmosphere.

In preparing magnesium-manganese ferrite components using the wet process of the present invention, a metal ion solution was prepared to produce a molar percentage in the components of:
50% Fe$_2$O$_3$,
30% MgO, and
20% MnO.
The compositional results achieved with this example were as follows:
51 Mole % Fe$_2$O$_3$,
28.5 mole % MgO, and
20.5 mole % MnO.

Among the various MgMn ferrite compositions known from the conventional dry process art, the molar percentage of the MgO can vary from about 10% to 40%, the molar percentage of the MnO can vary from about 10% to 40%, and at times ZnO up to about fifteen mole percent 15% can be used. The ferric oxide can vary from about (35-50%).

Sodium or potassium compounds are preferred in preparing the carbonate-hydroxide ion solution since magnesium carbonate is soluble in excess ammonium salt solutions. In the specific example, potassium compounds were used in preparing the carbonate-hydroxide solution. The pH of the latter solution with a value of 11 was reduced to a value of about 8.2 by addition of the metal ion solution. In order to speed up the precipitation reaction the solution was brought to a boil for about five minutes; the resulting pH, after boil, was 8.7. Other process steps were carried out as described in relation to the manganese-zinc ferrities; with, however, the firing being carried out at 1200° C. in air and furnace cooling being carried out in nitrogen.

In the manufacture of manganese-zinc materials, the present wet process provides recycling features which enhance its economy and ecological aspects. Referring to FIGS. 1 and 2, the separated liquid phase, carried through means 32, comprises an aqueous solution of free ammonia, ammonium ions and sulfate ions. This liquid phase is treated with lime to liberate ammonia in reclaim apparatus 68 of FIG. 1.

Referring to FIG. 2 for a more detailed description of the ammonia reclaim process, the separated liquid phase of stream 32 is pumped into a liming tank 68. As separated liquid phase is accumulated, lime is introduced into the tank from source 70. Chemical grade hydrated lime is preferably slaked before addition. Reaction times up to about 5 hours are allowed. During the reaction time, precipitation of calcium sulfate takes place by reaction of the ammonium sulfate with the calcium hydroxide, as follows:

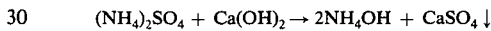

$$(NH_4)_2SO_4 + Ca(OH)_2 \rightarrow 2NH_4OH + CaSO_4 \downarrow$$

This leaves a clear liquid phase containing aqua-ammonia.

The reaction mixture is transferred by means 72 to sulfate filter means 74, such as a vacuum filter of the rotary disc type. In the sulfate filter means 74, the clear liquid phase is separated from the calcium sulfate. The calcium sulfate (plaster of paris) presents no disposal problems. The calcium sulfate can also be recycled but that is not economically feasible ordinarily. However, if sufficient waste heat were available from other processes to make the process economical, the calcium sulfate could be reacted to produce sulfuric acid and lime, both of which can be recycled.

The clear liquid filtrate from means 74 is transferred by means 78 to storage means 80 for accumulation as required prior to distillation. Accumulated filtrate is fed from storage facility 80 through means 82 into a distillation column 86. The distilled product from this operation is transferred through means 88. Such product is rich in ammonia and leaves a residue which is disposed of through means 90. It is desirable that such residue contain less than two parts per million nitrogen so that normal sewage disposal can be used.

In a preferred process, temperatures for stripping ammonia range from about 95° C. to about 105° C. are utilized in the bottom of the distillation column means. The product rich in ammonia has a concentration ranging from 2.0 to 4.0 molar.

Distillation means suitable for the present use are known in the art, a perforated-plate column can be used. The accumulated filtrate is fed at the midpoint of the column and heat is applied at the bottom in the form of steam. Thus the hottest, most dilute solution is at the bottom and the most concentrated solution is at the top. A condenser at the top of the column provides the concentrated liquid, that is a product rich in ammonia. This product is transferred through means 88. The residue, removed through means 90, as well as the product, can be used to preheat the feed into the column.

The product rich in ammonia transmitted through conduit means 88 is used to form the carbonate ion-hydroxide ion solution into which the aqueous metal ion solution is added. A continuous type of recycling of materials results.

The conversion of the product rich in ammonia to carbonated ammonia is carried out by feeding carbon dioxide in countercurrent relationship to the distilled product. For example carbon dioxide can be fed into the bottom of a column such as apparatus 92. The ratio of carbon dioxide to the aqua ammonia determines whether ammonium carbonate or ammonium bicarbonate is formed. The source of a portion of the carbon dioxide can be the off gas of the calcining step from calciner 42 carried over conduit 44, as shown in FIG. 1.

The flow diagram depicted by FIGS. 1 and 2 can be utilized in the production of the manganese-zinc ferrite components of the following specific example. In forming the aqueous metal ion solution, 27,460 grams of electrolytic ion powder, 8,206 grams of electrolytic manganese flake or powder, and 4,506 grams of zinc pellets are introduced into tank 12. The weight percentages of the metals, based on the total of all three metals, is 68.5% iron, 20.34% manganese, and 11.16% zinc. The mole percentages of these metals are 53.17% iron (as $Fe_2$), 32.09% manganese and 14.74% zinc. These molar percentages allow for the slight iron pickup in grinding the material subsequent to calcining. The metal used in accordance with the present invention have a total purity level greater than about 99.9% by weight.

After the metals are introduced into the tank, about 330 liters of de-ionized water (10 million ohm resistance) are introduced. Then 53.3 liters of concentrated sulfuric acid are added. Further heating to help dissolve the metals is provided by introduction of steam into the mix. The sulfuric acid is utilized in 29% stoichiometric excess. After dissolution of the metals, de-ionized water is added as needed to adjust the concentration to provide an aqueous solution having a concentration of total divalent metal ions of 1.5 moles per liter. The solution contains ferrous ions, divalent ions of manganese and zinc, and sulfate ions.

In the start-up operation being described, the carbonate-hydroxide solution is formed by dissolving ammonia gas (or by diluting aqua ammonia) to form a 1 molar solution in 961 liters of water. Then 69,440 grams of ammonium bicarbonate is added with stirring. The concentration of carbonate ions in this solution is 1.05 moles per liter. The pH of the carbonate ion-hydroxide ion solution should be about 11.

The carbonate ion-hydroxide ion solution used as part of the invention can be formed by carbonating an enriched ammonia solution with carbon dioxide as described earlier in the recycling operation. The concentration of ammonia should be about 2 moles per liter before carbonation. The pH of the carbonate ion-hydroxide ion solution should be about 11.

Formation of precipitate is carried out by continuously pumping the aqueous solution of divalent metal ions into the carbonate ion-hydroxide ion solution at a controlled rate with continuous stirring. The rate of addition is about 0.03 gallons per minute of the aqueous metal ion solution per gallon of the carbonate ion-hydroxide ion solution. During such addition, the temperature in the reaction mixture is controlled to be about 25° C. or lower. The metal ion solution addition is continued until the pH of the liquid phase in tank 18 is 7.5. The precipitating action involves coprecipitating ferrous, zinc, and manganese carbonates while concurrently coprecipitating ferrous, zinc, and manganese hydroxides. The coprecipitating reactions are carried out essentially without converting ferrous ions to ferric ions.

The dried precipitate is treated and compacted as previously described. Additives made during the size reducing step in the ball mill included about 0.045 weight % Ca, about 0.008 weight % Si, about 0.2 weight % $TiO_2$ and about one weight % $SnO_2$; a permeability of 2582 and a loss factor of $1.04 \times 10^{-6}$ at 100 kHz was obtained. Various combinations of titanium and tin can also be made in the range of 0 to 0.5 weight % $TiO_2$ and/or 0 to 1.25 weight % $SnO_2$.

Substitution of equivalent materials and steps made available in the light of present teachings may be made without departing from the spirit or essential characteristics of the invention. For example, in the metal ion solution forming step, acids other than sulfuric can be utilized. Nitric acid and hydrochloric acid are two practical substitutes. If an acid different from sulfuric is utilized, the ammonia reclaim step instead of consisting of precipitating followed by distillation consists simply of distillation. Also, if a decision is made to sacrifice purity and quality control for a cost benefit, metal ion solution forming can consist of dissolving relatively impure, less expensive, scrap metal.

Instead of the batch process described, a stirred flow reactor system can be utilized to carry out the coprecipitation reactions with the outlet stream going directly into the separating filter.

Ammonium compounds, as the source of carbonate and hydroxide ions, are preferred over the corresponding metallic compounds because the opportunity for residual metal is eliminated, i.e. the ammonia is volatile. However, potassium or sodium compounds can be utilized but possible residuals of sodium or potassium in the product detract from the magnetic properties and must be considered.

The term "article" or "component" as used includes cores such as pot cores, U & E cores, and toroids as well as recording heads, deflection yokes, blocks (which are machined by the consumer) and other parts that form or are joined together to form inductors.

What is claimed is:

1. Wet process for producing a material, consisting essentially of metal carbonates and metal hydroxides, for conversion into pulverant ferrimagnetic material compactable into soft ferrite components consisting essentially of ferric oxide and at least one divalent metal oxide, comprising the steps of
 (a) producing a precipitate and a liquid phase by
  (i) forming an aqueous metal ion solution of ferrous ions and divalent ions of at least one other metal in which the divalent metal ions of said at least one other metal are selected from the group consisting of $Mn^{++}Zn^{++}$, $Ni^{++}$, and $Mg^{++}$;
  (ii) providing a solution containing carbonate ions and hydroxide ions in which the source of carbonate ions is selected from the group consisting of ammonium bicarbonate, ammonium carbonate, sodium carbonate, and potassium carbonates,
  (iii) reacting said metal ion solution with said solution containing carbonate ions and hydroxide ions to coprecipitate ferrous carbonate and said other divalent metal ions as metal carbonates and to concurrently coprecipitate ferrous hydroxide and said other divalent metal ions as metal hydroxides, essentially without converting ferrous ions to ferric ions;

(iiii) controlling such coprecipitation to select a desired ratio between carbonate groups and hydroxide groups in the coprecipitated material, with the carbonate groups being at a level to facilitate separation of coprecipitated particles from the liquid phase and the hydroxide groups being at a level to maintain sufficient residual hydroxide groups to extend solid-state reactivity of coprecipitated particles for grain growth and densification purposes until a final heat treatment of a pressure compacted component;

(b) separating said coprecipitated material from the liquid phase, and (c) drying said separated coprecipitated material.

2. The method of claim 1 in which the aqueous metal ion solution is formed from metals selected to have a purity level greater than 99.9% by weight and in which the aqueous metal ion solution is formed by dissolving said pure metals in preselected proportions utilizing surfuric acid.

3. Forming a soft ferrite component comprising the steps of (a) producing a precipitate and a liquid phase by (i) forming an aqueous metal ion solution of ferrous ions and divalent ions of at least one other metal in which the divalent metal ions of said at least one other metal are selected from the group consisting of $Mn^{++}$, $Zn^{++}$, $Ni^{++}$, and $Mg^{++}$, (ii) providing a solution containing carbonate ions and hydroxide ions in which the source of carbonate ions is selected from the group consisting of ammonium bicarbonate, ammonium carbonate, sodium carbonate, and potassium carbonates and the hydroxide ions are selected from the group consisting of ammonium hydroxide, sodium hydroxide and potassium hydroxide, (iii) reacting said metal ion solution with said solution containing carbonate ions and hydroxide ions to coprecipitate ferrous carbonate and said other divalent metal ions as metal carbonates and to concurrently coprecipitate ferrous hydroxide and said other divalent metal ions as metal hydroxides, essentially without converting ferrous ions to ferric ions;

(iiii) controlling such coprecipitation to select a desired ratio between carbonate groups and hydroxide groups in the coprecipitated material, with the carbonate groups being at a level to facilitate separation of coprecipitated material from the liquid phase and the hydroxide groups being at a level to maintain sufficient residual hydroxide groups to extend solid-state reactivity of coprecipitated particles for grain growth and densification purposes until a final heat treatment of a pressure compacted component;

(b) separating said coprecipitated material from the liquid phase, (c) drying said separated coprecipitated material, (d) calcining the coprecipitated material in a temperature range of about 500° to about 800° C. to drive off carbon dioxide and to convert ferrous ions to ferric ions, (e) preparing such calcined material for compaction including size reducing and granulating, (f) compacting such calcined granulated material in the pressure range of about five to about forty tons per square inch to provide a component; and (g) applying a final heat treatment to the pressure compacted component including firing at elevated temperatures in the range of about 1000° to about 1250° C. in a sintering atmosphere containing about 20% by volume oxygen with the balance consisting essentially of nitrogen.

4. Forming a soft ferrite component comprising the steps of (a) producing a precipitate and a liquid phase by (i) forming an aqueous metal ion-solution of ferrous ions and divalent ions of at least one other metal in which the divalent metal ions of said at least one other metal are selected from the group consisting of $Mn^{++}$ and $Zn^{++}$;

(ii) providing a solution containing carbonate ions and hydroxide ions in which the source of carbonate ions is selected from the group consisting of ammonium bicarbonate, ammonium carbonate, sodium carbonate, and potassium carbonates and the hydroxide ions are selected from the group consisting of ammonium hydroxide, sodium hydroxide and potassium hydroxide;

(iii) reacting said metal ion solution with said solution containing carbonate ions and hydroxide ions to coprecipitate ferrous carbonate and said other divalent metal ions as metal carbonates and to concurrently coprecipitate ferrous hydroxide and said other divalent metal ions as metal hydroxides, essentially without converting ferrous ions to ferric ions;

(iiii) controlling such coprecipitation to select a desired ratio between carbonate groups and hydroxide groups in the coprecipitated material, with the carbonate groups being at a level to facilitate separation of coprecipitated material from the liquid phase and the hydroxide groups being at a level to maintain sufficient residual hydroxide groups to extend solid-state reactivity of coprecipitaed particles for grain growth and densification purposes until a final heat treatment of a pressure compacted component;

(b) separating said coprecipitated material from the liquid phase, (c) drying said separated coprecipitated material, (d) calcining the coprecipitated material in a temperature range of about 500° to about 800° C. to drive off carbon dioxide and to convert ferrous ions to ferric ions, (e) preparing such calcined material for compaction including size reducing and granulating, (f) compacting such calcined granulated material in the pressure range of about five to about forty tons per square inch to provide a component, and (g) applying a final heat treatment to the pressure compacted component including firing at elevated temperatures in the range of about 1000° C. to about 1250° C. in a sintering atmosphere containing 0.5 to 5% by volume oxygen with the balance consisting essentially of nitrogen.

5. Wet process for producing a material, consisting essentially of metal carbonates and metal hydroxides, for conversion into pulverant ferrimagnetic material compactable into manganese-zinc ferrite components consisting essentially of ferric oxide and divalent manganese and zinc oxides, with said ferric ions and said divalent manganese and zinc ions being in the ratio of 2:1, which components are formed by pressure compaction of pulverant ferrimagnetic material, which compaction can be carried out with equipment used for compacting conventional dry-process ferrite powder, comprising the steps of (a) producing a precipitate and a liquid phase by
 (i) forming an aqueous metal ion solution of ferrous ions and divalent ions of manganese and zinc;
 (ii) forming a carbonate-hydroxide solution containing carbonate ions and hydroxide ions in which the source of carbonate ions is selected from the group consisting of ammonium bicarbonate, ammonium carbonate, sodium carbonate, and potassium carbonates and the source of hydroxide ions is selected from the group consisting of ammonium hydroxide, sodium hydroxide, and potassium hydroxide;
 (iii) reacting said metal ion solution with said carbonate-hydroxide solution to coprecipitate ferrous carbonate, manganese carbonate, and zinc carbonate and to concurrently coprecipitate ferrous hydroxide, manganese hydroxide, and zinc hydroxide, essentially without converting ferrous ions to ferric ions;
 (iiii) controlling said coprecipitation to select a desired ratio between carbonate groups and hydroxide groups in the coprecipitated material, with the carbonate groups being at a level to facilitate separation from the liquid phase and the hydroxide groups being at a level to maintain sufficient residual hydroxide groups to extend solid-state reactivity of coprecipitated particles for grain growth and densification purposes until a final heat treatment of a pressure compacted component;

(b) separating the coprecipitated material from the liquid phase with said selected ratio of carbonate groups to hydroxide groups as measured after washing of the separated precipitate but before drying of washed precipitate is in a range of about 3:2 to about 20:1, and (c) drying the separated precipitate.

6. The process of claim 6 in which said ratio is in a range of about 4:1 to about 19:1.

7. The process of claim 5 in which the aqueous metal ion solution is formed by dissolving metals, selected to have a purity level greater than 99.9% by weight, in acid with the weight percentage of iron, manganese and zinc, based on the total of the three metals, ranging from
 about 66% to about 72% iron,
 about 16% to about 23% manganese, and
 about 5% to about 18% zinc.

8. The process of claim 7 in which sulfuric acid is used in an amount ranging from about 10 to about 30% over stoichiometric requirements for dissolution of the metals.

9. The method of claim 5 in which the aqueous metal ion solution is formed by dissolution of metals, selected to have a purity level greater than 99.9% by weight, in sulfuric acid to yield ferrous ions and divalent ions of manganese and zinc, and
 coprecipitation reactions are carried out by mixing the aqueous metal ion solution with the carbonate-hydroxide solution containing carbonate ions and hydroxide ions, in which the carbonate-hydroxide solution has a preselected pH in the range of 10 to 12.

10. The process of claim 9 in which
 the source of the carbonate ions is selected from the group consisting of ammonium bicarbonate, ammonium carbonate, and combinations thereof, and the source of the hydroxide ions is ammonium hydroxide.

11. The process of claim 10 in which such carbonate-hydroxide solution is prepared by dissolving a predetermined amount of ammonium hydroxide followed by dissolving a predetermined amount of the source of carbonate ions to provide the preselected pH for said carbonate-hydroxide solution.

12. The process of claim 9 in which the coprecipitation reactions are carried out by adding the aqueous metal ion solution to said carbonate-hydroxide solution with said addition being accompanied by continuous agitation.

13. The process of claim 9 in which the aqueous metal ion solution is added to the carbonate-hydroxide solution including the step of
 controlling the rate of addition of the aqueous solution of metal ions to the carbonate-hydroxide solution to control coprecipitated particle size and select the ratio of carbonate groups to hydroxide groups.

14. The process of claim 13 in which said rate of addition of the metal ion solution to the carbonate-hydroxide solution ranges from about 0.01 gallon per minute to about 0.05 gallon per minute of the aqueous metal ion solution per gallon of the carbonate hydroxide solution.

15. The process of claim 9 including control of temperature during mixing of the aqueous metal ion solution and carbonate-hydroxide solution, the temperature being controlled to be no higher than about 25° C.

16. The process of claim 5 in which the aqueous metal ion solution is formed to have a total concentration of metal ions ranging from about 1.4 to about 1.6 moles per liter.

17. The process of claim 9 in which said carbonate-hydroxide solution is formed to have a concentration of carbonate ions ranging from about 0.5 to about two moles per liter and the concentration of ammonium hydroxide is about two moles per liter.

18. The process of claim 9 in which the aqueous metal ion solution is added to such carbonate-hydroxide solution until a pH ranging from about 7 to about 8 is obtained.

19. The process of claim 18 in which the pH is in the range of 7.3 to 7.6.

20. Wet process for producing a material, consisting essentially of metal carbonates and metal hydroxides, for conversion into pulverant ferrimagnetic material compactable into manganese-zinc ferrite components consisting essentially of ferric oxide and divalent manganese and zinc oxides, with said ferric ions and said divalent manganese and zinc ions being in the ratio of 2:1, which components are formed by pressure compaction of pulverant ferrimagnetic material, which compaction can be carried out with equipment used for compacting conventional dryprocess ferrite powder, comprising the steps of (a) producing a precipitate and a liquid phase by
 (i) forming an aqueous metal ion solution of ferrous ions and divalent ions of manganese and zinc;

(ii) forming a carbonate-hydroxide solution containing carbonate ions and hydroxide ions in which the source of carbonate ions is selected from the group consisting of ammonium bicarbonate, ammonium carbonate, sodium carbonate, and potassium carbonates and the source of hydroxide ions is selected from the group consisting of ammonium hydroxide, sodium hydroxide, and potassium hydroxide;

(iii) reacting said metal ion solution with said carbonate-hydroxide solution to coprecipitate ferrous carbonate, manganese carbonate, and zinc carbonate and to concurrently coprecipitate ferrous hydroxide, manganese hydroxide, and zinc hydroxide essentially without converting ferrous ions to ferric ions;

(iiii) controlling said coprecipitation to select a desired ratio between carbonate groups and hydroxide groups in the coprecipitated material, with the carbonate groups being at a level to facilitate separation from the liquid phase and the hydroxide groups being at a level to maintain sufficient residual hydroxide groups to extend solid-state reactivity of coprecipitated particles for grain growth and densification purposes until a final heat treatment of a pressure compacted component;

(b) separating the coprecipitated material from the liquid phase with said selected ratio of carbonate groups to hydroxide groups as measured after washing of the separated precipitate but before drying of washed precipitate is in a range of about 3:2 to about 20:1, (c) drying the separated precipitate, (d) treating the liquid phase which contains sulfate ions and ammonium ions with lime to produce a calcium sulfate precipitate and a liquid portion containing ammonia, and (e) distilling such liquid portion to increase ammonia concentration.

21. The method of claim 20 in which such distillate is treated with $CO_2$ to form carbonate ammonia of preselected pH to which the aqueous metal ion solution is added.

22. Method for manufacturing manganese-zinc ferrite components consisting essentially of ferric oxide and divalent metal oxides, with ferric ions to divalent metal ions being in the ratio of 2:1 comprising the steps of (a) providing a precipitate and a liquid phase by (i) forming an aqueous solution of metal ions by dissolution of metals selected to have a purity level greater than 99.9% by weight, in sulfuric acid;

(ii) forming a carbonate-hydroxide solution containing carbonate ions and hydroxide ions in which the source of carbonate ions is selected from the group consisting of ammonium bicarbonate, ammonium carbonate, sodium carbonate, and potassium carbonates, and the source of hydroxide ions is selected from the group consisting of ammonium hydroxide, sodium hydroxide and potassium hydroxide, (iii) reacting said aqueous metal ion solution with said carbonate-hydroxide solution to coprecipitate ferrous carbonate, manganese carbonate, and zinc carbonate and to concurrently coprecipitate ferrous hydroxide, manganese hydroxide, and zinc hydroxide, essentially without converting ferrous ions to ferric ions;

(iiii) controlling said coprecipitation to select a desired ratio between carbonate groups and hydroxide groups in the coprecipitated particles, with the carbonate groups being at a level to facilitate separation from the liquid phase and washing of coprecipitated particles and the hydroxide groups being at a level to maintain sufficient residual hydroxide groups to extend solid-state reactivity of coprecipitated particles for grain growth and densification purposes until a final heat treatment of a pressure compacted component;

(b) separating the coprecipitated particles from the liquid phase, (c) drying the precipitate and calcining in a temperature range of about 500° to about 800° C. to drive off carbon dioxide and to convert ferrous ions to ferric ions, (d) preparing said calcined material for compaction including size reducing and granulating, (e) compacting said calcined granulated material with a pressure range of about 5 to about 40 tons per square inch to provide a component, and (f) applying a final heat treatment to the pressure compacted component including firing at elevated temperatures in the range of about 1000° to about 1200° C. in a sintering atmosphere containing 0.5 to 5% by volume oxygen with the balance consisting essentially of nitrogen.

23. The method of claim 22 where the precipitation for compaction includes size reducing the dried precipitate to an average pulverant size ranging from about 0.3 to about 0.7 microns.

24. The method of claim 23 including
adding a binder during size reducing, and in which granulating is carried out to form agglomerated granules of a size between about 45 to 250 microns,
said binder being capable of being burned off in subsequent heat treatments at temperatures in the range of 300° C. to 600° C.

25. The method of claim 24 in which the granules are compacted to a density in the range of about 2 to about 3.5 grams per cubic centimeter.

26. The method of claim 22 in which compacting is carried out at pressures ranging from about 15 to about 25 tons per square inch.

27. The method of claim 24 including
burning off such binder by heating the compacted article in air at a temperature of 400° to 500° C. prior to the firing step.

28. The method of claim 22 wherein such cooling is carried out by progressively reducing temperature while progressively reducing oxygen content by decreasing partial pressure exerted by the oxygen as the temperature is reduced to about 900° C. during a period between one and two hours while the percentage of oxygen is reduced to about 0.1%.

29. Dried precipitate consisting essentially of $Fe^{++}$, $Mn^{++}$, and $Zn^{++}$ carbonates and $Fe^{++}$, $Mn^{++}$, and $Zn^{++}$ hydroxides, for conversion into pulverant ferrimagnetic material compactable into manganese-zinc ferrite components produced in accordance with claim 5.

30. Manganese-zinc ferrite component consisting essentially of
about 50 mole % $Fe_2O_3$,
about 2 to about 9 mole % FeO,
about 31 to about 36 mole % MnO, and
about 10 to about 15 mole % ZnO
produced in accordance with the method of claim 4.

* * * * *

UNITED STATES PATENT OFFICE
CERTIFICATE OF CORRECTION

Patent No. 4,097,392           Dated June 27, 1978

Inventor(s) Alex Goldman, Alfred M. Laing

It is certified that error appears in the above-identified patent and that said Letters Patent are hereby corrected as shown below:

Column 5, line 65, after "flakes" insert a comma --,--.

Column 10, line 22, after "1150°C." insert --to 1180° C.--;
   line 64, "ferri-magnetic" should read
   --ferrimagnetic--.

Column 11, lines 63 and 64, "mole percent 15% can be used. The ferric oxide can vary from about (35-50%)." should read --mole percent (15%) can be used. The ferric oxide can vary from about thirty-five to fifty mole percent (35-50%).--.

Column 13, line 22, "ion" should read --iron--;
   line 31, "metal" should read --metals--.

Column 15, line 65, "500°" should read --500° C.--.

UNITED STATES PATENT OFFICE
CERTIFICATE OF CORRECTION

Patent No. 4,097,392     Dated June 27, 1978

Inventor(s) Alex Goldman, Alfred M. Laing

It is certified that error appears in the above-identified patent and that said Letters Patent are hereby corrected as shown below:

Column 16, line 8, "1000°" should read --1000° C.--;
          line 15, "ion-solution" should read
            --ion solution--;
          line 51, "500°" should read --500° C.--.

Column 17, line 46, "claim 6" should read --claim 5--.

Column 18, line 63, "dryprocess" should read --dry-process--.

Column 20, line 16, "500°" should read --500° C.--;
          line 26, "1000°" should read --1000° C.--;
          line 30, "precipitation" should read --preparation--;
          line 47, "400°" should read --400° C.--.

Signed and Sealed this

Twenty-sixth Day of December 1978

[SEAL]

Attest:

RUTH C. MASON
Attesting Officer

DONALD W. BANNER
Commissioner of Patents and Trademarks